United States Patent [19]

Bussienne

[11] 3,721,326
[45] March 20, 1973

[54] DEVICE FOR MOUNTING ROLLERS ON A RUNWAY

[75] Inventor: Christian Edmond Bussienne, Louviers, France

[73] Assignee: Construction Mills K, Saint Ouen, France

[22] Filed: Feb. 1, 1971

[21] Appl. No.: 111,299

[30] Foreign Application Priority Data

Feb. 5, 1970 France...............................7004008

[52] U.S. Cl....................................193/35 R, 193/37
[51] Int. Cl..............................................B65g 13/11
[58] Field of Search......193/35 R, 36, 37; 198/127 R

[56] References Cited

UNITED STATES PATENTS

| 1,406,228 | 2/1922 | Riedel | 193/35 R |
|---|---|---|---|
| 2,391,272 | 12/1945 | Rose | 193/35 R |
| 3,258,097 | 6/1966 | Wahl | 193/37 |
| 3,037,603 | 6/1962 | Kornylak | 193/37 |
| 1,111,474 | 9/1914 | Lenfestey | 193/37 X |
| 3,586,142 | 6/1971 | Inwood | 193/35 |
| 2,827,153 | 3/1958 | Olk et al. | 193/35 R X |
| 3,420,348 | 1/1969 | Caudell et al. | 193/35 R |
| 2,923,391 | 2/1960 | Hewitt | 193/35 R |
| 872,856 | 12/1907 | Spence | 193/37 X |

FOREIGN PATENTS OR APPLICATIONS

| 985,792 | 3/1965 | England | 193/37 |
|---|---|---|---|
| 1,004,438 | 3/1952 | France | 193/35 R |

Primary Examiner—Harvey C. Hornsby
Assistant Examiner—W. Scott Carson
Attorney—William A. Drucker

[57] ABSTRACT

Device for rapidly assembling a multiplicity of rollers with a section member of a runway which also affords an improved running of the rollers.

It comprises on the inner faces of the flanges of a U-section member tabs constituting clips which grip the periphery of a side-member bearing. The bearing has a plane face which lies flat against the inner face of the flange and a central bore in which the spindle end portion of the roller is mounted.

An application of the device is in conveyors and storage systems in which objects travel along runways.

1 Claim, 2 Drawing Figures

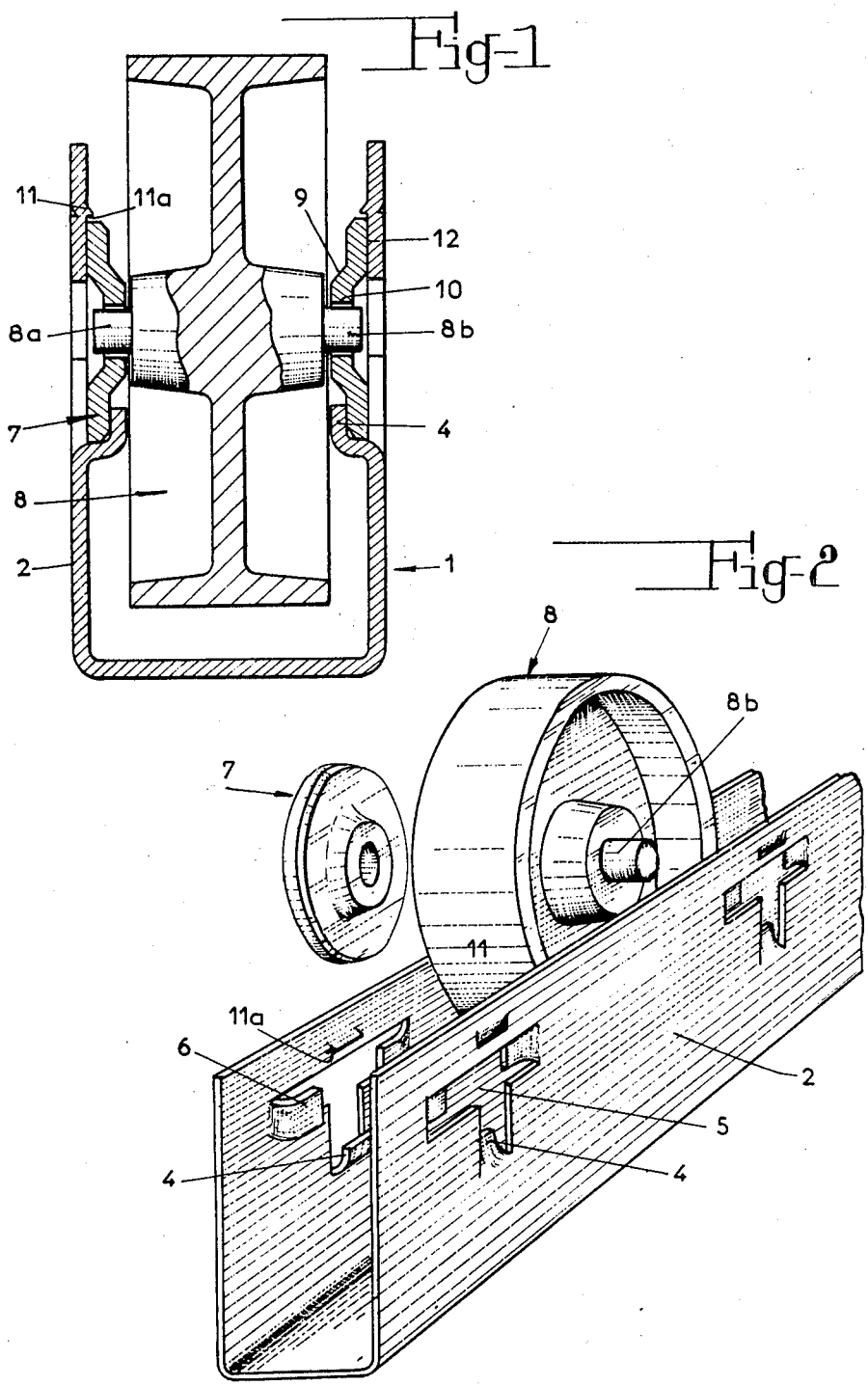

DEVICE FOR MOUNTING ROLLERS ON A RUNWAY

The present invention relates to a device for mounting rollers on a runway of utility in rolling conveyors or storage systems in which objects placed in a given region are stocked in travelling one behind the other down a slight slope.

In order to keep the price of these runways or rails low, it is desirable to assemble the rollers as simply as possible while allowing a rapid mounting.

The simplest way to mount in a U-section member acting as a rail or runway a multiplicity of rollers, would be to drill holes in the flanges of the rail, pass the spindles through the holes and rollers and then lock the spindles in position with at least one resiliently yieldable clip. Such an assembly requires machining the parts and is quite incompatible with cheap mass-production. Moreover, any spindle fixing means which projects outwardly of the flanges of the section member may be inconvenient.

In one known arrangement, an inverted U-section member the U supporting the roller, a pierced opening, the piercing operation leaving lateral tabs adjacent the opening so that when these tabs are folded along the casier walls of the section member, they constitute, by an arrangement of an upwardly open shot terminating in a part-circular recess formed in the tab, a supporting bearing for the roller spindle. The roller with its two spindle end portions is inserted in the slots of the facing tabs from above and is locked in the part-circular recesses. Moreover, it will be observed that in this arrangement the length of the bearing of the spindles in the tabs is of necessity determined by the thickness of the material of the section member. As the latter is generally of sheet metal, a poor rolling motion results, especially as dust or dirt or the like can settle in the slots of the supporting tabs which have open upper ends.

The object of the present invention is to considerably improve these conditions by means of a simple and rapid assembly which provides each roller with a true bearing whose rolling quality does not diminish in use and can be as good as desired, in particular for constituting a rail acting as a runway for objects.

The invention provides a device for assembling rollers with a runway comprising a section member having two parallel flanges provided internally with tabs receiving said rollers, wherein said tabs are in the form of flat clips folded in spaced relation to the inner faces of the flanges, and each roller has two spindle end portions which are engaged in center bores in side-member bearing against the inner face of the corresponding flange, said bearings having an edge whose thickness is such that it is secured merely by being gripped by said clips.

According to another feature of the invention, the parallel flanges of the section member are provided, above the periphery of the bearing secured by the clips, with a projecting portion constituting a retaining lug which resiliently locks the bearing when it is introduced in the clips with its roller. Advantageously, the side-member bearing is produced by the moulding of a superpolyamide commercially known under the name of "Nylon."

An embodiment of the invention is described hereinafter with its various features with reference the accompanying drawing in which:

FIG. 1 is a sectional view, in a plane perpendicular to a runway, of a roller and its assembly with side-member bearings, and FIG. 2 is a perspective view of the component parts ready for assembly.

The runway shown in FIG. 1 comprises a section member generally designated by the reference numeral 1 and including flanges 2 and 3 which were pierced before folding. In the piercing operation, there were formed a number of spaced-apart openings 5, depending on the desired number of rollers, and offset tabs 4, 6 constituting clips. FIG. 2 shows a lower tab clip 4 and two facing tabs 6. A roller, generally designated by the reference numeral 8, comprises two spindle end portions 8a, 8b which are engaged in center bores 10 in side-member bearings 7.

The side-member bearing 7 has the shape of a circular disc having a spigot 9 on the side thereof opposed to a plane face 12, this spigot 9 constituting a transverse abutment or thrust bearing for the roller. The thickness $a$ of the peripheral edge of the disc is such that it is a force fit in the part of the tabs 4 and 6 remote from the free ends thereof.

There is also formed on the flange of the section member above each spindle of the roller and at a distance from the axis of the spindle exceeding the radius of the disc, a slight boss or savelling 11 which defines a sloping portion determinating in a nose 11a. This boss is produced by a press operation at the same time as the openings 5 producing the tabs 4, 6.

With reference to FIG. 2, it will be understood that the assembly is extremely simple. With the side-member bearings mounted on the spindle end portions of the roller, it suffices to lower this sub-assembly by forcing the bearings into the tab clips 4 and 6. There is a resilient reaction between the plane faces 12 and the bosses 11 followed by a locking by the noses 11a. The side-member bearing is preferably made from a plastics material, for example superpolyamide known commercially as "Nylon" which results in a very smooth-running friction against the stell of the spindles. It will be understood that a metal such as bronze would also be suitable as a bearing material. However, as the spigot 9 of the side-member bearings also acts as a transverse abutment for the rollers, a plastics material is preferred.

As already mentioned, the assembly according to the invention is of particular utility in object-handling systems of the dynamic storage type. This manner of storing comprises supplying objects to one side of a group of racks, the objects moving one behind the other on a runway downwardly sloping toward the exit side of the rack. This affords a more rational transport of objects in stores.

Owing to the device according to the invention which results in a very smooth running, this manner of storing becomes applicable to light objects.

The tab clips may have various shapes and be connected in various ways with the flanges of the section member and the side-member bearing may be, for example, square or hexagonal or have any shaped revolution suitable for being gripped by the tabs.

I claim:

1. In a device for assembling rollers with a runway comprising a section member having two parallel flanges provided internally with a plurality of tabs in the form of flat clips folded in spaced relation to the inner faces, each roller having two spindle end portions, the improvement in which said device includes two generally disc-shaped flexible removable members each provided with a central aperture and each having a plane face bearing against the inner face of the corresponding flange, said disc shaped flexible member being tightly fitted between the respective inner faces and a lower tab and two laterally arranged tabs and an upper tab shaped as a locking element for each respective disc-shaped flexible member and said spindle end portions being respectively engaged in said apertures.

* * * * *